Figure 1:
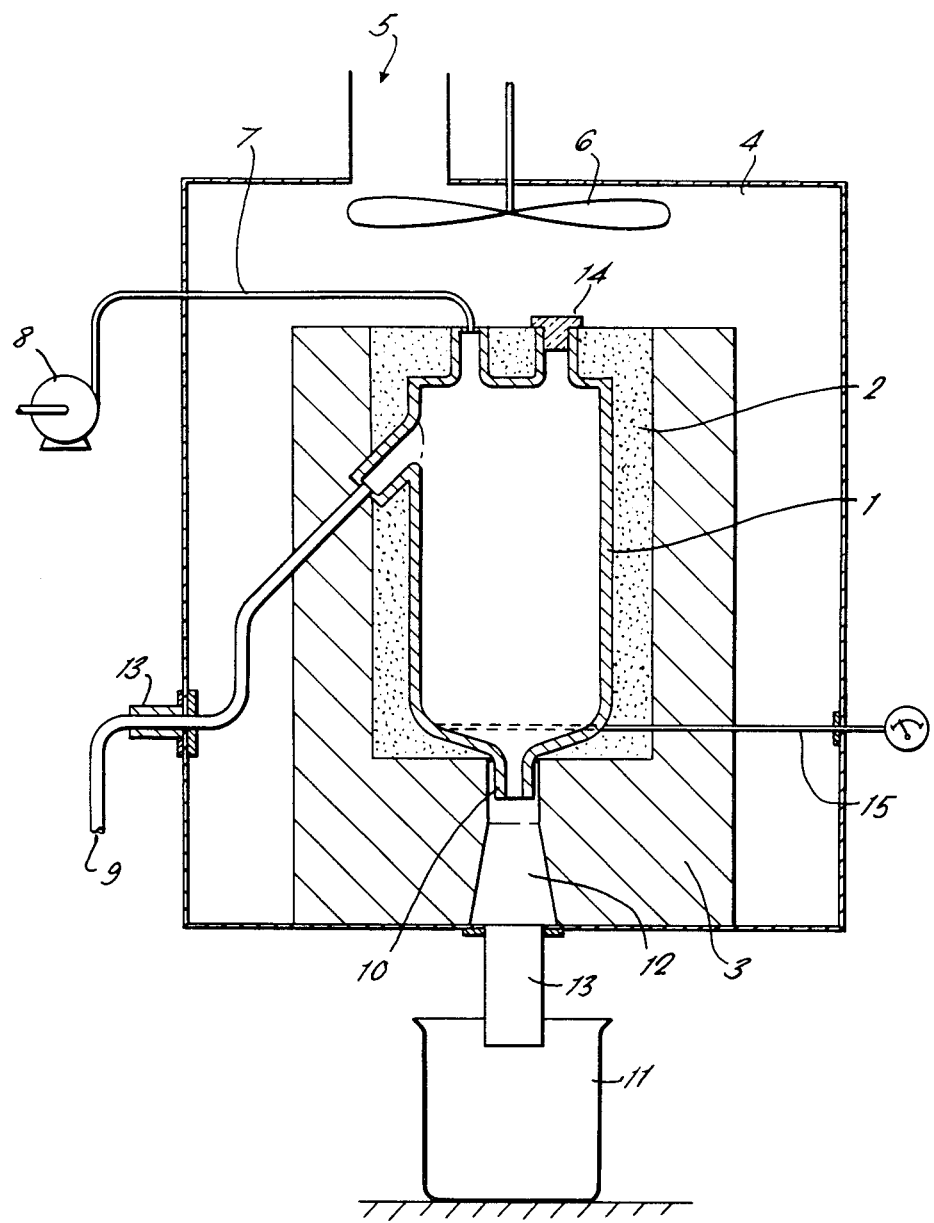

United States Patent [19]

Hardwick et al.

[11] Patent Number: 4,490,287
[45] Date of Patent: Dec. 25, 1984

[54] TREATMENT OF SUBSTANCES

[75] Inventors: William H. Hardwick, Didcot; Ronald Gayler, Wantage, both of England

[73] Assignee: United Kingdom Atomic Energy Authority, London, England

[21] Appl. No.: 358,047

[22] Filed: Mar. 15, 1982

Related U.S. Application Data

[60] Continuation of Ser. No. 94,857, Nov. 16, 1979, abandoned, which is a division of Ser. No. 816,684, Jul. 18, 1977, Pat. No. 4,221,680.

[30] Foreign Application Priority Data

Jul. 29, 1976 [GB] United Kingdom ............... 31745/76

[51] Int. Cl.³ ............................................... G21F 9/16
[52] U.S. Cl. .................................... 252/629; 252/630; 252/631; 219/10.55 R; 219/10.57; 422/159; 422/186; 422/903
[58] Field of Search ............... 252/631, 632, 628, 629, 252/630; 34/1; 219/10.55 R, 10.56; 422/159, 903, 186

[56] References Cited

U.S. PATENT DOCUMENTS

| 3,171,009 | 2/1965 | Scheiler et al. ............... | 219/10.65 |
| 3,365,578 | 1/1968 | Grover et al. ............... | 252/629 |
| 3,555,693 | 1/1971 | Futer ............................. | 34/1 |
| 4,065,400 | 12/1977 | Bjorklund ...................... | 252/629 |
| 4,116,598 | 9/1978 | Alexandrov .................... | 219/10.65 |

FOREIGN PATENT DOCUMENTS 50-102797 8/1975 Japan .................................. 252/631
1407978 10/1975 United Kingdom .

OTHER PUBLICATIONS

Loeding et al., "Fluidized Bed Conversion . . . " *Proc. 2nd U.N. Int'l. Conf. Peaceful Uses Atom Energy*, Geneva (1958), vol. 18, pp. 56–67.

Peterson et al., *Chemistry in Nuclear Technology* Addison-Wesley Publishing Co., Reading, Mass., 1963, pp. 194–195.

Lynch, E. P., "The Use of Microwave Energy in Conjunction With Fluidized Bed Reactors" Report 1977, Conf.-771125-3.

*Primary Examiner*—Deborah L. Kyle
*Attorney, Agent, or Firm*—Larson and Taylor

[57] ABSTRACT

A process and apparatus are disclosed for the treatment of a substance contained in a solution of a slurry.

The solution or slurry is treated in a fluidized bed to give a fusible dried product by use of microwave radiation.

The fusible dried product can be heated and fused by use of microwave radiation.

7 Claims, 3 Drawing Figures

TREATMENT OF SUBSTANCES

This is a continuation of co-pending application Ser. No. 094,857, filed Nov. 16, 1979, now abandoned, which was a divisional application of application Ser. No. 816,684 filed July 18, 1977 now U.S. Pat. No. 4,221,680.

The present invention relates to the treatment of substances and finds one application in the incorporation of radioactive wastes in a solid material (i.e. solidification and vitrification of radioactive waste) for the purposes of handling and storage.

According to one aspect of the present invention there is provided a process for the treatment of a substance contained in a solution or slurry which includes subjecting the solution or slurry to the influence of microwave radiation to produce a fusible dried product, said fusible dried product including a dried form of the substance.

According to another aspect of the present invention there is provided a process for the treatment of a substance contained in a solution or a slurry which includes subjecting the solution or slurry to the influence of microwave radiation to produce a fusible dried product, said fusible dried product including a dried form of the substance, and heating the fusible dried product to fuse it.

According to a further aspect of the present invention there is provided a process for the treatment of a substance contained in a solution or a slurry which includes treating the solution or slurry to produce a fusible dried product, said fusible dried product including a dried form of the substance, and subjecting the fusible dried product to the influence of microwave radiation to heat and fuse it.

The term "solution" as used herein embraces a colloidal solution and a suspension, and the term "slurry" as used herein embraces sludge. Microwave radiation may be used both in the The present invention relates to the treatment of substances and finds one application in the incorporation of radioactive wastes in a solid material (i.e. solidification and vitrification of radioactive waste) for the purposes of handling and storage.

According to one aspect of the present invention there is provided a process for the treatment of a substance contained in a solution or slurry which includes subjecting the solution or slurry to the influence of microwave radiation to produce a fusible dried product, said fusible dried product including a dried form of the substance.

According to another aspect of the present invention there is provided a process for the treatment of a substance contained in a solution or a slurry which includes subjecting the solution or slurry to the influence of microwave radiation to produce a fusible dried product, said fusible dried product including a dried form of the substance, and heating the fusible dried product to fuse it.

According to a further aspect of the present invention there is provided a process for the treatment of a substance contained in a solution or a slurry which includes treating the solution or slurry to produce a fusible dried product, said fusible dried product including a dried form of the substance, and subjecting the fusible dried product to the influence of microwave radiation to heat and fuse it.

The term "solution" as used herein embraces a colloidal solution and a suspension, and the term "slurry" as used herein embraces sludge. Microwave radiation may be used both in the production of a fusible dried product and in the fusing thereof.

The solution or slurry may be subjected to microwave radiation to an extent such that only the liquid component of the solution or slurry is removed therefrom, or to an extent which in addition to the removal of the liquid component results in the chemical decomposition of at least a portion of the residue obtained when the liquid component has been removed.

The dried product may be arranged to contain at least one glass-forming or ceramic-forming component (e.g. silica and borax) capable of forming on its own, or with the dried form of the substance, a glass-like or ceramic material, in which case, after heating to cause fusing, and cooling, the substance will be incorporated in a glass-like or ceramic, solid material.

Thus, for example, at least one glass-forming or ceramic-forming component (or a precursor for either of these) may be incorporated in the solution or slurry before production of the fusible dried product (e.g. before the solution or slurry is subjected to microwave radiation where such radiation is used to produce the fusible dried product). Alternatively, at least one glass-forming, or ceramic-forming component (or a precursor for either of these) may be added to the dried product so that after heating to cause fusing and cooling the substance will be incorporated in a glass-like or ceramic solid material.

Radioactive wastes for example, uranium, transuranium elements and fission product elements resulting from nuclear fuel reprocessing processes, can be incorporated into ceramic and glass-like solid materials by a process in accordance with the present invention. Such radioactive wastes may comprise solutions containing nitric acid, uranium, transuranium elements and fission products, and corrosion products of reprocessing equipment.

It will be appreciated that such wastes may contain, or on drying give rise to, decomposable chemical compounds, for example nitrates.

Thus, if the solution or slurry is treated only to the extent such that the liquid component of the solution or slurry is removed therefrom to give a dried product, the compounds will be decomposed during the heating of the dried product to fuse it. Conversely, if the solution or slurry is treated to an extent which also results in the decomposition of the compounds, the heating of the dried product to fuse it will not have also to achieve such decomposition. During the decomposition of the compounds water of crystallisation may be removed.

Radioactive wastes containing neutron poisons may also be treated in accordance with the present invention.

A further example of a solution or slurry which may be treated in accordance with the present invention is a suspension or slurry of a magnesium compound (e.g. a suspension or slurry derived from fuel element cooling pound waters in certain types of nuclear reactor). Thus, for example, an aqueous suspension of basic magnesium carbonate can be evaporated to dryness by use of microwave radiation to give a fusible dried product and the dried product mixed with glass forming components. Subsequently the mixture of fusible dried product and glass-forming components can be fused by being subjected to the influence of microwave radiation, and cooled to give a glass-like material containing magnesium (e.g. in the form of magnesia).

Alternatively an aqueous suspension of a magnesium compound can be coagulated with a silicate-based coagulant (a glass-forming component precursor) and the resulting sludge dried and fused by use of microwave radiation.

Glasses themselves may be regarded as supercooled-liquids, but it is intended that the term 'solid material' as used herein should include glasses and glass-like materials. With regard to the incorporation of radioactive substances in glass materials reference can be made to our British Pat. Nos. 1,019,373, 1,050,818 and 1,064,583.

Microwave heating may be used to produce the fusible dried product and to fuse it, for example, in one continuous operation; alternatively the fusible dried product may be fused by use of other forms of heating, such as resistance heating. A further alternative is for a fusible dried product to be formed by some other drying treatment, such as spray drying, and for microwave radiation to be used in heating the dried product to fuse it. (It will be appreciated that if the other drying treatment used does not result in the decomposition of decomposable chemical compounds in the solution or slurry, microwave radiation may be used to effect decomposition and fusing).

Thus, the present invention further provides a process for the fusing of material which comprises subjecting the material to the influence of microwave radiation. Also the present invention further provides a process for the decomposition of a chemical compound which comprises subjecting the chemical compound to the influence of microwave radiation.

In a first embodiment of the invention a solution containing a radioactive waste may be contained in vessels of a glass which can combine with oxides present in the dried product, produced from the solution, to form a suitable storage material. In this embodiment a series of such vessels may be passed continuously through a microwave oven, to convert the solution therein to a dried product, and discharged into a melter pot wherein the dried product may be fused with the vessels to form a homogeneous glass. The vessels may be closed by a porous glass filter to contain dust. Glass or quartz are suitable materials for vessels to be used in a microwave field.

In a second embodiment of the invention a solution containing radioactive wastes may be applied to a glass fibre tape, or "wick", the tape subsequently passed through a microwave field to produce a dried product on the tape, and the tape and dried product heated to melt them so as to form a homogeneous glass incorporating radioactive waste. The molten glass may be collected directly in a vessel suitable for subsequent storage thereof.

In a third embodiment of the invention a stainless steel vessel may be used to contain a radioactive waste solution and constituents of a material for forming a glass-like material, and microwave radiation may be introduced into the vessel by means of a suitable wave guide arrangement for example, through a silica "window", so that the solution can be dried to form a dried product suitable for treatment (either by microwave or other heating) to give a homogeneous glass incorporating radioactive waste.

It is believed that a metal vessel itself can constitute a microwave cavity for subjecting a solution or slurry contained therein to microwave radiation.

In a fourth embodiment of the invention a solution or slurry to be treated in accordance with the invention (e.g. a solution or slurry of a radioactive waste and glass-forming components to be treated to form a glass-like solid incorporating the radioactive waste), may be fed to a suitable process vessel and the vessel subjected to a microwave field, thereby first to dry the solution to a dried product and then to fuse it.

This embodiment offers the possibility for continuous treatment of a solution or slurry and conveniently means are provided for withdrawing fused material from the process vessel at a rate compatible with the rate of introduction of solution or slurry.

It is believed that to obtain the temperatures required to effect drying and fusing, it is necessary to provide around the process vessel good thermal insulation which is transparent to microwave radiation (e.g. 'Vermiculite').

The process vessel may be made of a ceramic material and may be subjected to microwave radiation by being positioned inside a microwave cavity (oven).

Since the heating by microwave radiation tends to be localised in the region of the process vessel (especially where thermal insulation is provided as hereinbefore mentioned) oven walls need not necessarily be made from thick, heat-resisting materials.

In a fifth embodiment of the invention a solution or slurry to be treated in accordance with the invention (e.g. a solution or slurry of a radioactive waste and glass forming components to be treated to form a glass-like solid incorporating the radioactive waste) may be subjected to microwave radiation whilst in a fluidised bed.

Thus, for example, the production of a dried product can be carried out in a fluidised bed under the influence of microwave radiation and the dried product can be fused in a separate non-fluidised melter/received (which may be heated by microwave radiation or other forms of heating).

The microwave radiation may be introduced into the fluidised bed by use of wave guides and by means of a microwave-transparent window (e.g. of quartz).

In an example of the fifth embodiment of the invention. applicable to the incorporation of radioactive wastes in glass-like materials, particles (e.g. spheres of 0.01–0.1 mm diameter) of glass formers (e.g. Na, Li, $B_2O_3$ and $SiO_2$) may be fed to a fluidised bed into which a solution or slurry containing radioactive waste is also fed and to which microwave radiation is introduced thereby to produce particles of glass-formers coated with dried product formed from the solution or slurry containing radioactive waste.

These coated particles may then be passed to a melter, which may be a final storage vessel, in which they are fused to produce a glass-like material containing the radioactive waste by means of microwave or other heating.

Optionally off-gases from the fluidised bed can be scrubbed to remove dust by countercurrent contact with uncoated particles (e.g. spheres) in a second vessel prior to entering the fluidised bed (e.g. in a second fluidised scrubbing bed or a vibrated scribbing bed). The second vessel used for scrubbing can be conveniently of larger diameter than the fluidised bed to suit gas flow requirements.

In another arrangement, given by way of example, off-gases from a vessel in which a solution or slurry is treated in accordance with the present invention (e.g. in accordance with the fourth embodiment hereinbefore disclosed) may be treated to remove dust by means of a chamber containing baffles.

Conveniently the chamber may be subjected to microwave radiation (e.g. by being enclosed in the same microwave cavity as the vessel in which the solution or slurry is treated or in an adjacent microwave cavity).

Thus, off-gases may be passed through the chamber so that dust in the off-gases collects on the baffles and is subsequently melted off due to microwave heating.

The melted dust may be united with fused product from the vessel in which the solution or slurry is treated. In the chamber microwave heating may be achieved by the coupling of the dust with microwave radiation. It is believed that microwave heating may be achieved by arranging that the baffles also couple with microwave radiation.

Gases leaving the chamber may be passed to other treatment apparatus (e.g. a condenser).

In a sixth embodiment of the invention, a solution or slurry to be treated in accordance with the invention (e.g. a solution or slurry of a radioactive waste to be treated to form a glass-like solid incorporating the radioactive waste) is fed to a slug of glass fibre and absorbed therein, and a microwave field applied to produce a dried product on the slug; subsequently the slug loaded with dried product can be passed to a melting apparatus and fused to produce a molten glass-like material incorporating the radioactive waste.

In one example of the immediately foregoing embodiment a train of slugs of glass fibre are positioned in a tube which can be subjected to the influence of microwave radiation. Solution or slurry to be treated is fed to a slug, absorbed therein and converted to a dried product by means of microwave radiation. Thus the slug becomes "loaded" with dried product. A fresh slug of glass fibre can be inserted into the end of the tube remote from that containing the loaded slug such that the train of slugs is pushed along the tube and the loaded slug is ejected from the other end of the tube. The loading and ejection of further slugs then proceeds in the same manner such that slugs are treated sequentially. By arranging for off-gases produced during the production of the dried product to be removed from a point on the tube which is disposed towards the end of the tube remote from that containing the loaded slugs, the off-gases can be made to pass through, and thereby be filtered by, successive "clean" slugs of glass fibre. It will be appreciated that since the train of slugs is pushed along the tube, the filtering slugs are continually being renewed.

A melting apparatus suitable for use in connection with the immediately foregoing embodiment of the invention may comprise a ceramic melting vessel surrounded by microwave transparent thermal insulation located in a microwave cavity. The "loaded" slugs carrying dried product can be ejected directly to the melting apparatus if desired.

It will be appreciated that in the immediately foregoing aspect of the invention the use of glass fibre can obviate the need to supply glass-forming components in the solution or slurry and hence reduce the total amount of solution or slurry to be processed.

At least partial decomposition of chemical compounds in the solution or slurry (e.g. partial denitration in the case of a radioactive waste containing nitric acid) can take place during production of dried product on the slug.

According to a further aspect the present invention provides apparatus for carrying out a process in accordance with the invention.

Thus, according to a further aspect the present invention provides apparatus for the treatment of a substance contained in a solution or slurry comprising means for subjecting the solution or slurry to the influence of microwave radiation to produce a fusible dried product, said fusible dried product including a dried form of the substance.

In a further aspect the invention also provides apparatus for the treatment of a substance contained in a solution or a slurry comprising means for treating the solution or slurry to produce a fusible dried product, said fusible dried product including a dried form of the substance, and means for heating the fusible dried product to fuse it wherein:
  (i) the means for treating the solution or slurry comprises means for subjecting the solution or slurry to the influence of microwave radiation; and/or
  (ii) the means for heating the fusible dried product to fuse it comprises means for subjecting the fusible dried product to the influence of microwave radiation.

In one embodiment apparatus comprises a vessel, thermal insulation around the vessel, means for introducing solution or slurry to be treated to the vessel, means for subjecting the vessel to microwave radiation to produce a fusible dried product from the solution or slurry and to fuse the fusible dried product.

Preferably means are provided for withdrawing fused dried product from the vessel.

In another embodiment apparatus comprising a fluidised bed vessel, means for feeding solution or slurry to be treated to the fluidised bed vessel, means for feeding fluidising gas to the fluidised bed vessel, means for feeding particles to the fluidised bed vessel, means for introducing microwave radiation to the fluidised bed vessel and means for withdrawing fusible dried product from the fluidised bed vessel, the arrangement being such that the fusible dried product can be formed on the particles and removed therewith from the fluidised bed vessel.

The apparatus of the immediately foregoing embodiment may have a second vessel containing particles wherein dust can be removed from off-gases from the fluidised bed vessel by countercurrent contact with the particles.

In a further embodiment apparatus comprises means for feeding a solution or slurry to be treated to a slug of glass fibre to be absorbed therein and means for applying a microwave field to the slug to produce dried product on the slug.

The apparatus of the immediately foregoing embodiment may have a melting vessel for fusing the slug and dried product to produce a molten glas-like material, and means for feeding the slug and dried product to the melting vessel.

The invention also provides a fusible dried product or a fused fusible dried product whenever prepared by a process in accordance with the present invention.

Figure 2:
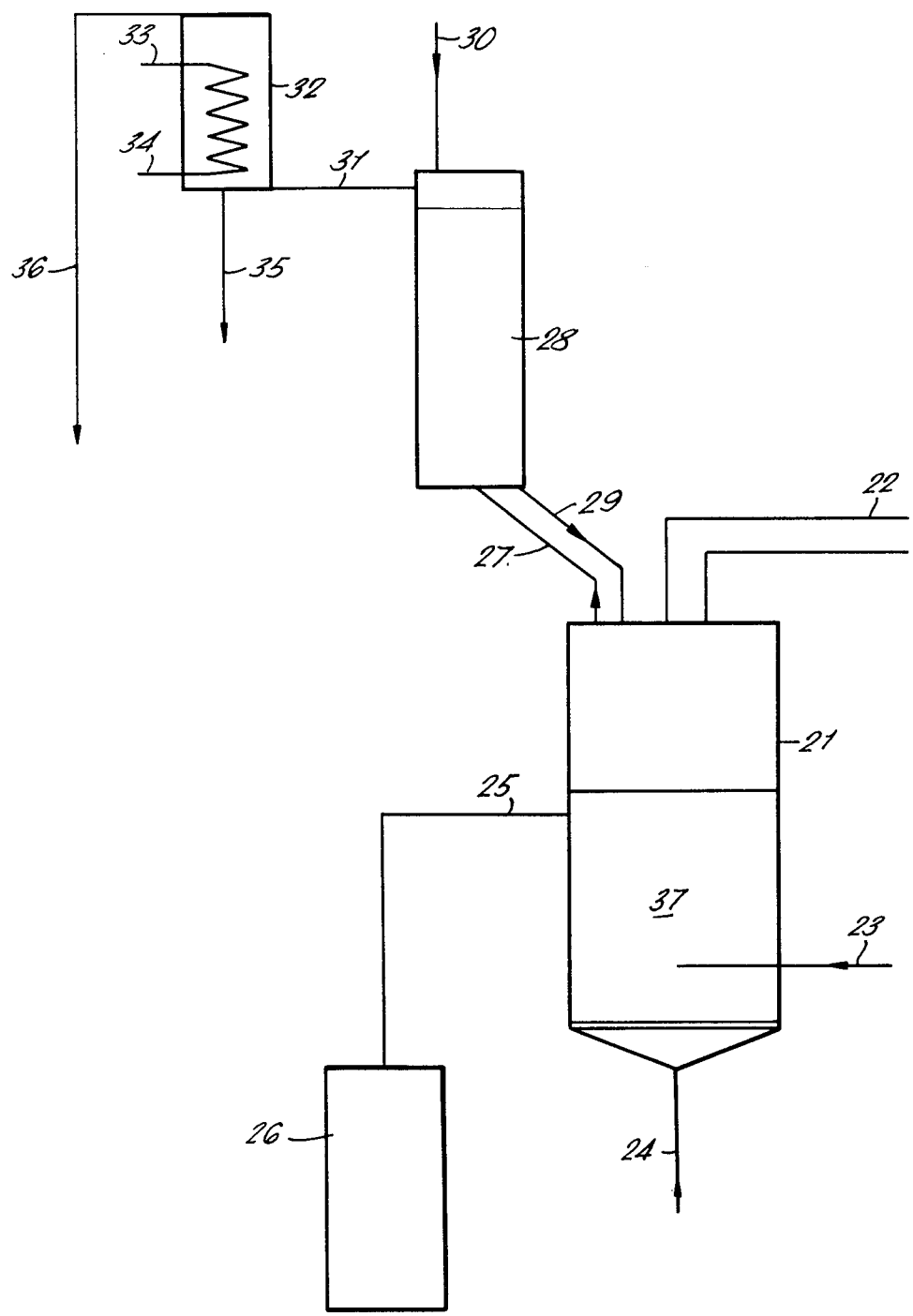
Figure 3:
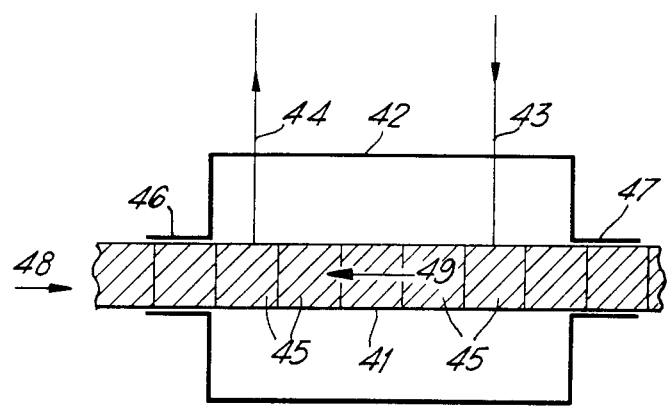

The invention will now be illustrated, by way of example only, with reference to the accompanying drawings in which:

FIG. 1 is a diagrammatic representation of an apparatus for the continuous treatment of a solution or slurry in accordance with the present invention, FIG. 2 is a diagrammatic representation of a fluidised bed apparatus for treatment of a solution or slurry in accordance with the present invention, and FIG. 3 is a diagrammatic representation of a further apparatus for the treatment of a solution or slurry in accordance with the present invention.

Referring now to FIG. 1 of the drawings there is shown a process vessel 1, composed of a heat-resistant material (e.g. stoneware clay, zircon or zirconia) surrounded with Vermiculate thermal insulation 2 and silica/alumina thermal insulating bricks 3 and enclosed within a microwave oven 4. The microwave oven 4 is provided with a wave guide 5 for the introduction of microwave radiation and an oven mode stirrer 6.

An inlet pipe 7, fabricated from stainless steel and earthed to the oven 4 is provided to connect a feed pump 8 with the process vessel 1. The process vessel 1 is also provided with an outlet pipe 9 for the removal of gas/vapour therefrom, and a product outlet 10 for the passage of fused product to a collector 11 via aperture 12 in the thermal insulation 2 and 3.

Microwave chokes 13 are provided at apertures in the microwave oven 4. Additionally there is provided a pressure relief device 14 in the process vessel 1 and a thermocouple temperature indicator 15.

In operation solution or slurry to be treated to produce a dried product which is subsequently fused, is drawn from a supply (not shown) by pump 8 and delivered to the process vessel 1 via inlet pipe 7.

Microwave radiation from a microwave source (e.g. a Magnetron) is introduced to the oven 4 by means of wave guide 5 and is distributed with the aid of oven mode stirrer 6. Due to coupling of the microwave radiation with solution or slurry in the process vessel 1 heat is generated therein and thermal energy is inhibited from escaping by thermal insulation 2 and 3.

Consequently the temperature in the process vessel 1 rises to provide conditions in which the slurry or solution is converted to a dried product and the dried product is fused and runs out of the product outlet 10 to be collected in the collector 11 wherein it may solidify.

Vapour and gases (from drying and possibly decomposition of constituents of the solution or slurry) are withdrawn through pipe 9.

Due to the fact that inlet pipe 7 is earthed the solution or slurry passing therein is protected from microwave radiation. Thus it is only when solution or slurry leaves the inlet pipe 7 to enter the process vessel 1 that it is subjected to heating. This reduces the risk of blockage due to premature solidification of solution or slurry on its way from the pump 8.

It should be noted that during start-up of the apparatus, a solid starting charge of a fusible material capable of coupling with microwave radiation may be placed in the process vessel 1 and subjected to microwave radiation to provide initial heating. The starting charge may be prepared by drying and fusing a sample of solution or slurry to be treated.

If desired it can be arranged to permit microwave radiation to couple to the collector 11 to provide heating thereof thereby to promote efficient filling of the collector 11, reduce stresses in the solidifying product by preventing too rapid cooling, and to anneal the product.

Referring now to FIG. 2 of the drawings there is shown diagrammatically a fluidised bed vessel 21 having a wave guide 22 for the introduction of microwaves, a solution/slurry inlet 23, a fluidising gas inlet 24, a dried product outlet 25, connected to a melter/receiver 26, and an off-gas outlet 27.

An insulating window of microwave transparent material (not shown) may be placed between wave guide 22 and vessel 21.

The off-gas outlet 27 is connected to a scrubber bed 28, for containing a particulate solid material, which has means 29 for discharging particulate solid material to the fluidised bed vessel 21. Off-gas outlet 27 and means 29 may be provided by a single piece of apparatus (e.g. a pipe).

A particulate solid material inlet 30 is provided for charging the scrubber bed 28 and an off-gas outlet 31 is provided to connect the scrubber bed 28 to a condenser 32.

The condenser 32 has cooling-fluid inlet 33 and outlet 34, an outlet 35 for condensate, and a gas outlet 36 which can be connected to a gas clean-up plant (not shown).

In operation, particulate solid material is introduced to the fluidised bed vessel 21 via means 29 and is maintained as a fluidised bed (represented as 37) by use of fluidising gas inlet 24.

Solution or slurry to be treated is introduced via inlet 23 and microwave radiation (e.g. from a Magnetron source not shown) is directed into the vessel 21 via wave guide 22.

Due to the coupling of the microwave radiation with the contents of the fluidised bed 37 the temperature rises thereby to form particles of the solid material coated with a dried product formed from the solution or slurry.

The coated solid particles are discharged by means of dried product outlet 25 to melter/receiver 26 wherein they may be fused by heating (e.g. with microwave energy or other means).

Off-gases leave vessel 21 via outlet 27 and pass to scrubber bed 28 wherein contaminents in the off-gases are scrubbed out by contact with fresh particulate solid material.

Particulate solid material can be passed counter-current to the off-gas and into the vessel 21 via means 29 thereby carrying back contaminants scrubbed from the off-gases.

The scrubber-bed 28 can contain a fluidised bed of particulate solid material or a vibrating bed thereof. Fresh particulate solid material is introduced via inlet 30. Off-gases from scrubber bed 28 are passed to condenser 32 (cooled by passing a cooling fluid via 33 and 34) to give a condensate at outlet 35, and gas at outlet 36 for processing in a clean-up plant.

In a particular example of the present invention the particulate solid material may comprise spheres (0.01–0.1 mm diameter) of glass formers (e.g. Na, Li, $B_2O_3$ and $SiO_2$) and the solution or slurry may contain radioactive waste, so that in the fluidised bed vessel 21 spheres of glass-formers are produced having a coating of dried product formed from the solution or slurry containing radioactive waste.

Thus, after fusing in the melter/receiver (26) a glass-like solid incorporating radioactive waste is produced.

Referring now to FIG. 3 of the drawings, there is shown a tube 41 a portion of which is located within a microwave oven 42. The tube 41 is provided with an inlet pipe 43 and a gas/vapour outlet 44 and is adapted to contain slugs of glass fibres 45.

To permit tube 41 to extend out of the microwave oven 42 apertures 46 and 47 are provided.

It will be appreciated that, in accordance with microwave technology, microwave chokes (not shown) may be provided as necessary at apertures 46 and 47 and also where inlet pipe 43 and gas/vapour outlet 44 penetrate the walls of the oven 42.

In operation, the slugs of glass fibre 45 are introduced into the tube 41 from the direction 48. Subsequently, solution to be treated is introduced onto a slug 45 via inlet 43, is absorbed therein and subsequently converted to a dried product thereon by application of microwave radiation in the microwave oven 42. (It will be appreciated that microwave radiation is introduced into the microwave oven 42 in a known manner through a wave guide (not shown)).

Off-gases produced during the production of the dried product pass through the tube 41 in the direction 49 and therefore pass through, and are filtered by, the "fresh" slugs 45 located in the tube 41 before being discharged therefrom through the gas/vapour outlet 44. Off-gases removed through the outlet 44 can be passed to other treatment apparatus, for example a condensate system, for further treatment.

Subsequently a fresh slug 45 is introduced into the tube 41 from the direction 48 with the result that all of the slugs 45 move along the tube in that direction such that "loaded" slugs 45 carrying dried product are thereby moved out of the microwave oven 42 through the aperture 47 and are ultimately discharged from the tube 41.

"Loaded" slugs 45 can be discharged from the tube 41 directly to a melting apparatus which may comprise a ceramic melting vessel surrounded by a microwave transparent thermal insulation located in a microwave oven.

It will be appreciated that an automatic loading mechanism can be used to introduce fresh glass fibre slugs 45 to the tube 41 in a continuous or semi-continuous manner.

It will be appreciated that the present invention is not limited to the treatment of radioactive wastes and that solutions of salts or slurries of non-radioactive substances can be subjected to drying, decomposition and fusion in accordance with the present invention to give a glass-like or ceramic material containing a non-radioactive substance (e.g. in the production of glasses).

It will be appreciated that the use of microwave radiation enables the energy applied to be almost wholly absorbed in the matter to be treated thus avoiding the need to pass heat through the walls of containment vessels.

The invention will now be further described with reference to the following Examples:

EXAMPLE 1

In this example a feed solution simulating a radioactive waste solution was subjected to microwave radiation.

The feed solution was a solution/suspension containing nitric acid, 25.7% by weight simulated "waste oxides" (containing some uranium but composed mainly of rare earths, aluminium, iron and magnesium) and the following glass forming components:

$Na_2O$: 8.3 wt%, $Li_2O$: 4.0 wt%, $B_2O_3$: 11.1 wt%, $SiO_2$: 50.9 wt%.

126 g of the feed solution were placed in a Pyrex (Reg. Trade mark) beaker and subjected to microwave radiation (from a Magnetron source) in a microwave oven until a dried product was obtained. It was noted that 40 ml of liquid were evaporated in 5 minutes using a power of 750 watts.

The beaker and dried product therein were returned to the oven and with the power still set at 750 watts the dried product underwent further decomposition, with the release of nitrous fumes. The temperature rose to bright red heat and the heating was stopped. It was found, after cooling, that the dried product had been converted to a vitreous, glass-like mass.

EXAMPLE 2

In this example an apparatus of the type disclosed in FIG. 1 was used to treat a feed solution having the same composition as given in Example 1.

For start-up 252 g of preformed fusible dried product (prepared from the solution to be treated) was placed in a vessel, said vessel being surrounded by thermal insulation and situated in a microwave oven (see FIG. 1).

Microwave power was applied and increased to a maximum of ~1.4 KW over a period of 1 hour, and the vessel and fusible product brought up to a temperature of 1020° C. Feed solution as in Example 1 was fed to the vessel initially at 6 ml/min and microwave power maintained at ~1.4 Kw.

Glass flowed from an outlet in the base of the vessel irregularly and was collected in a beaker of water beneath the oven. It is believed that the irregularity of flow was due to the effects of surface tension at the low flow rates used.

The main portion of the experiment was conducted with a feed solution flow rate of 7.5 ml/min.

It was convenient to end the experiment after ~9 hours although there was no reason to suppose the process could not have been operated indefinitely.

During the experiment the oven was maintained at 1000°–1050° C. and 4.84 liters of feed solution treated to enable 1.344 Kg of glass to be collected (glass production rate 2.14 g/min).

EXAMPLE 3

A volume of 400 ml of a suspension of magnesium basic carbonate in water (containing the equivalent of 36 g oxide) was introduced into an alumina tube having a closed bottom end and mounted vertically in thermal insulation.

The suspension was subject to microwave radiation (power 1–1.5 Kw) and evaporated to give a fusible dried product. The temperature rose to 970° C. in 80 minutes.

At 970° C. glass-forming components were added in the form of a glass frit (200 g) and 20 minutes further application of microwaves took the temperature to 1110° C. at which the contents of the tube was molten.

A glass-like solid was obtained on cooling.

We claim:

1. A process for the treatment of a substance contained in an aqueous solution or slurry containing radioactive waste whereby the substance is incorporated in a glass-like or ceramic material, which comprises:

subjecting the solution or slurry containing radioactive waste to the influence of microwave radiation in a fluidized bed to dry the solution or slurry and thereby produce a fusible dried product;

feeding particles of glass-formers to said fluidized bed to produce product particles of glass-formers coated with the fusible dried product formed from said solution or slurry containing the radioactive waste;

scrubbing off-gases from the fluidized bed to remove dust by counter-currently contacting said off-gases with said particles entering the fluidized bed;

heating said product particles to fuse them; and cooling the fused product particles to produce a glass-like or ceramic material comprising said substance.

2. A process according to claim 1 wherein said waste comprises a metal compound selected from the group consisting of nitrates and carbonates.

3. A process according to claim 2 wherein said metal compound is radioactive.

4. A process according to claim 1 wherein said radioactive waste comprises a member selected from the group consisting of uranium, transuranium elements, fission products, elements resulting from nuclear fuel reprocessing, and magnesium.

5. A process according to claim 1 wherein said fusing of said fusible dried product is effected by heating said fusible dried product with microwaves.

6. A process according to claim 1 wherein said glass-forming compound is present in said solution or slurry.

7. A process according to claim 1 wherein said fusible dried product comprises a glass-forming or ceramic forming material and wherein said glass-forming or ceramic-forming component comprises said material.

* * * * *